US007916729B2

(12) United States Patent
Mohapatra et al.

(10) Patent No.: US 7,916,729 B2
(45) Date of Patent: Mar. 29, 2011

(54) AUTOMATIC RD REWRITE TECHNIQUE TO ACHIEVE FAST CONVERGENCE IN INTER-AS NETWORKS

(75) Inventors: Pradosh Kumar Mohapatra, Fremont, CA (US); Clarence Filsfils, Brussels (BE); James Neil Guichard, New Boston, NH (US); Eric Rosen, Arlington, MA (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 12/241,445

(22) Filed: Sep. 30, 2008

(65) Prior Publication Data

US 2010/0080222 A1  Apr. 1, 2010

(51) Int. Cl.
*H04L 12/28* (2006.01)
(52) U.S. Cl. ........ 370/392; 370/401; 370/248; 370/225; 370/252; 370/352
(58) Field of Classification Search .................. None
See application file for complete search history.

(56) References Cited

U.S. PATENT DOCUMENTS

| | | | | |
|---|---|---|---|---|
| 7,028,092 B2 * | 4/2006 | MeLampy et al. | ............ | 709/230 |
| 7,307,990 B2 * | 12/2007 | Rosen et al. | ................. | 370/392 |
| 2005/0044262 A1 | 2/2005 | Luo | | |
| 2006/0013209 A1 | 1/2006 | Somasundaram | | |
| 2006/0013232 A1 | 1/2006 | Xu et al. | | |
| 2006/0171323 A1 | 8/2006 | Qian et al. | | |
| 2006/0209831 A1 | 9/2006 | Shephard et al. | | |
| 2006/0233181 A1 * | 10/2006 | Raszuk et al. | ................ | 370/401 |
| 2007/0008953 A1 | 1/2007 | Wing et al. | | |
| 2007/0025377 A1 | 2/2007 | Charny et al. | | |
| 2008/0062861 A1 | 3/2008 | Shand et al. | | |
| 2008/0062986 A1 | 3/2008 | Shand et al. | | |
| 2009/0116483 A1 * | 5/2009 | Anumala et al. | ............. | 370/392 |

OTHER PUBLICATIONS

Y. Rekhter, et al. Cisco Systems. A Border Gateway Protocol 4 (BGP-4). Mar. 1995. http://tools.ietf.org/html/rfc1771.
E. Rosen, et al. Cisco Systems, Inc. BGP/MPLS IP Virtual Private Networks (VPNs). Feb. 2006. http://www.ietf.org/rfc/rfc434.txt.
Bruno, et al. Border Gateway Protocol, Route Manipulation, and IP Multicast. Oct. 26, 2007. ciscopress.com.
Cisco Systems, Inc. MPLS VPN-Inter-AS Option AB. Dec. 17, 2007.

* cited by examiner

*Primary Examiner* — Duc C Ho
(74) *Attorney, Agent, or Firm* — Schwegman, Lundberg & Woessner, P.A.

(57) ABSTRACT

A virtual private network (VPN) is formed with a pair of autonomous systems (ASes) connected by each having at least two autonomous system border routers (ASBRs) connected to the corresponding ASBRs at the other AS, referred to as an Option B VPN-IPv4 network. Route reflectors (RRs) only reflect the best Border Gateway Protocol (BGP) paths, providing no backup BGP paths for fast convergence. Advantageously, an automatic route distinguisher (RD) rewrite component at the ASBRs creates unique prefixes and advertises the original RD as transitive attribute in an update message to external AS peers. Each RD gets mapped to another unique prefix at the ASBR and also that two ASBRs will create different unique prefixes. Thus, the route reflector sees different prefixes and reflects all of them. The ingress provider edge (PE) router can import the prefixes and correctly obtain the alternate paths for fast convergence.

34 Claims, 6 Drawing Sheets

AUTOMATIC RD REWRITE TECHNIQUE TO ACHIEVE FAST CONVERGENCE IN INTER-AS NETWORKS

BACKGROUND

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS is generally referred to as a "domain," and a router that interconnects different domains is generally referred to as an "Autonomous System Border Router (ASBR)".

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

Overview

Border Gateway Protocol (BGP) is a path-vector routing protocol for interdomain routing that is suited for setting routing policies between autonomous systems; it is neither a distance-vector nor link-state routing protocol. The primary function of BGP is to provide and exchange network-reachability information between domains or autonomous systems. In the enterprise campus architecture, BGP is used in the Internet connectivity module. BGP is the de facto standard for routing between service providers on the Internet because of its rich features. You can also use it to exchange routes in large internal networks.

Device convergence in the control plane is when a routing device is said to have converged at the point in time when all actions in the control plane needed to react to changes in topology have been performed. For example, when considering BGP convergence, the convergence resulting from a change that alters the best route instance for a single prefix at a router would be deemed to have occurred when this route is advertised to its downstream peers. The convergence process, in general, can be subdivided into three distinct phases: (a) convergence across the entire Internet, (b) convergence within an Autonomous System, and (c) convergence with respect to a single device. Convergence with respect to a single device can be with regard to data forwarding process (es) or with regard to the routing process(es). Tension exists in being able to quickly adapt to a change in topology without making the tracking of alternate paths so burdensome as to hamper normal operations.

The following presents a simplified overview of the specification in order to provide a basic understanding of some aspects of the technology. This overview is not an extensive overview of the disclosure. It is not intended to identify key/critical elements of the disclosure or to delineate the scope of the technology. Its sole purpose is to present some concepts of the technology in a simplified form as a prelude to the more detailed description that is presented later.

The technology disclosed and claimed herein, in one aspect thereof, comprises autonomous system border routers (ASBRs) that can advantageously rewrite route distinguishers (RDs) such that multiple paths are created for the same VPN IPv4 prefix at route reflectors (RRs). At the RR, the rewritten prefixes appear to be different prefixes and thus not only the best Border Gateway Protocol (BGP) paths are reflected but also alternate BGP paths. Ingress provider edge (PE) routers can import the prefixes correctly to use the alternate BGP paths for fast convergence when necessary.

In one aspect, a method assigns a set of unique numbers to each border router (ASBR) of an origin autonomous system (AS) having a plurality of ASBRs communicating to a plurality of ASBRs of a neighboring AS creating a plurality of paths between ASes in a virtual private network (VPN). An original route distinguisher (RD) is rewritten such that a rewritten RD appears unique for each origin ASBR to preserve alternate Border Gateway Protocol (BGP) paths reflected by a route reflector in a neighboring AS that would otherwise hide all but a best route. The rewritten route distinguisher is sent to a peer in the neighboring AS for correct importation of the prefix to determine alternate paths for BGP fast convergence.

In another aspect, a method receives at an ingress provider edge (PE) router a rewritten route distinguisher (RD) from a peer that is one border router (ASBR) of an origin autonomous system (AS) having a plurality of ASBRs communicating to a plurality of ASBRs of a neighboring AS creating a plurality of paths between ASes, the peer being of the neighboring AS. An original route distinguisher (RD) is decoded from the rewritten RD that appears unique for each origin ASBR to preserve alternate Border Gateway Protocol (BGP) paths reflected by a route reflector in a neighboring AS.

In an additional aspect, an apparatus has an administrator communication interface for assignment of a set of unique numbers to each border router (ASBR) of an origin autonomous system (AS) having a plurality of ASBRs communicating to a plurality of ASBRs of a neighboring AS creating a plurality of paths between ASes in a virtual private network (VPN). An automatic route distinguisher (RD) component rewrites an original route distinguisher (RD) such that a rewritten RD appears unique for each origin ASBR to preserve alternate Border Gateway Protocol (BGP) paths reflected by a route reflector in a neighboring AS. A communication module sends the rewritten route distinguisher to a peer in the neighboring AS for correct importation of the prefix to determine alternate paths for BGP fast convergence.

In a further aspect, an apparatus has a communication module for receiving at an ingress provider edge (PE) router a rewritten route distinguisher (RD) from a peer that is one border router (ASBR) of an origin autonomous system (AS) having a plurality of ASBRs communicating to a plurality of ASBRs of a neighboring AS creating a plurality of paths between ASes, the peer being of the neighboring AS. An automatic route distinguisher (RD) component decodes an original route distinguisher (RD) from the rewritten RD that appears unique for each origin ASBR to preserve alternate Border Gateway Protocol (BGP) paths reflected by a route reflector in a neighboring AS. To the accomplishment of the foregoing and related ends, certain illustrative aspects are described herein in connection with the following description and the annexed drawings. These aspects are indicative, however, of but a few of the various ways in which the principles of the technology can be employed and the subject specification is intended to include all such aspects and their equivalents. Other advantages and features of the technology will become apparent from the following detailed description when considered in conjunction with the drawings.

DESCRIPTION OF EXAMPLE EMBODIMENTS

A virtual private network (VPN) is formed with a pair of autonomous systems (ASes) connected by each having at least two autonomous system border routers (ASBRs) connected to the corresponding ASBRs at the other AS, referred to as an Option B VPN-IPv4 network. Route reflectors (RRs) only reflect the best Border Gateway Protocol (BGP) paths, providing no backup BGP paths for fast convergence. Advantageously, an automatic route distinguisher (RD) rewrite component at the ASBRs creates unique prefixes and advertises the original RD as transitive attribute in an update message to external AS peers. Each RD gets mapped to another unique prefix at the ASBR and also that two ASBRs will create different unique prefixes. Thus, the route reflector sees different prefixes and reflects all of them. The ingress provider edge (PE) router can import the prefixes and correctly obtain the alternate paths for fast convergence.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Situations arise in which there are more than one site of a Virtual Private Network (VPN) are connected to different ASes, such as when connected to different Service Providers (SPs) or same service provider but different ASes. A Provider Edge (PE) router attached to that VPN cannot maintain iBGP connections with each other or with a common route reflector, wherein "internal Border Gateway Protocol" is BGP between routers within the same AS. Rather, it is necessary to use an external Border Gateway Protocol (EBGP) to distribute VPN-IPv4 addresses.

Figure 1:
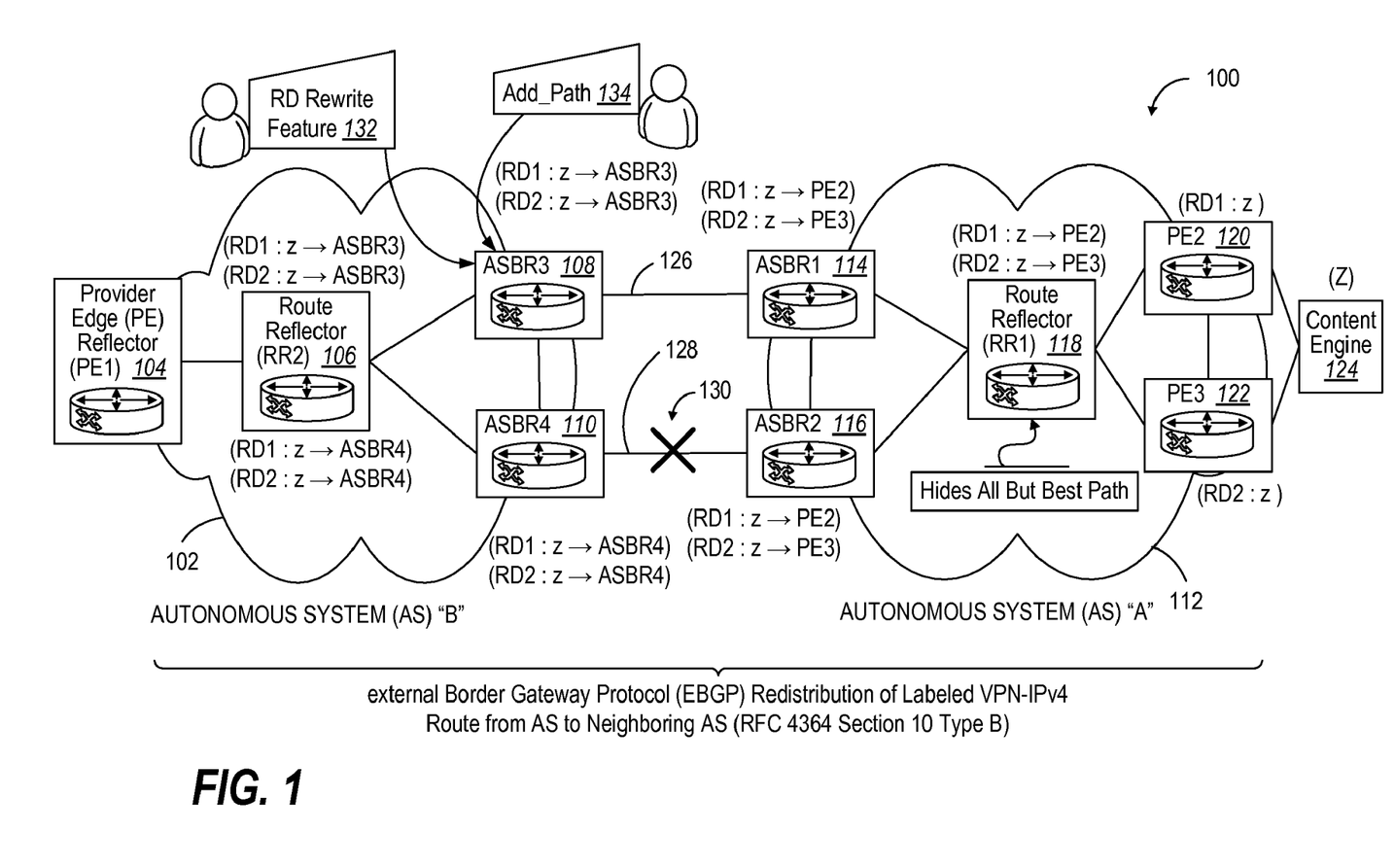
FIG. 1 illustrates a block diagram of a Virtual Private Network (VPN) connecting two autonomous systems (ASes) with external Border Gateway Protocol (EBGP) performing VPN-IPv4 label redistribution without benefit of backup BGP paths for fast convergence.

One way referred to as "Inter-AS Option B Network" pertains to EBGP redistribution of labeled VPN-IPv4 routes from an AS to a neighboring AS, as illustratively depicted in FIG. 1 as a Inter-AS Option B network 100. PE routers use iBGP to advertise labeled VPN-IPv4 routes either to an Autonomous System Border Router (ASBR), or to a route reflector of which an ASBR is a client. The ASBR then uses EBGP to advertise those labeled VPN-IPv4 routes to an ASBR in another AS, which in turn distributes them to the PE routers in that AS, or perhaps to a route reflector, which in turn distributes them, and so on.

In FIG. 1, this is depicted as an Autonomous System (AS) "B" 102 having a Provider Edge Router (PE1) 104 connected to a route reflector (RR2) 106, which in turn is connected to an ASBR3 108 and an ASBR4 110, both of which are also interconnected. An Autonomous System (AS) "A" 112 has interconnected ASBR1 114 and ASBR2 116 that connected respectively to ASBR3 108 and ASBR4 110 of AS B 102. ASBR1 114 and ASBR2 116 are both connected within AS A 112 to route reflector (RR1) 118 which in turn is connected to interconnected Provider Edge router (PE2) 120 and Provider Edge router (PE3) router 122, which in turn both connect to an external customer edge router (CE) 124.

The distribution of paths is annotated in the depicted network 100 for accessing content (depicted here as a route Z) at CE 124. The CE 124 is dually-connected to PE2 120 and PE3 122 of service provider AS A 112. The PE2 120 and PE3 122 are configured with unique RDs, RD1 and RD2 respectively. The RR1 118 receives both VPN prefix (RD1:z) and (RD2:z) with next hops PE2 and PE3, respectively. The RR1 118 reflects both VPN prefixes. The ASBR3 108 and ASBR4 110 advertises them across the autonomous systems boundary. Following through the BGP control plane advertisement as depicted in FIG. 1, RR2 106 of AS B 102 receives two paths for each prefix and chooses a best path for each. The end result is that PE 1104 receives both VPN prefixes (RD1:z) and (RD2:z) but with the same next-hop, either ASBR1 114 or ASBR2 116. Thus, when the path to that ASBR2 116 becomes unreachable as depicted at 130, the PE1 104 does not have a backup path that it can revert to.

Available techniques for mitigation are not wholly satisfactory. An RD rewrite feature 132 is manual, requiring that a human operator configure through route policies an RD mapping at the ASBRs 108, 110, 114, 116, which can prove cumbersome. An ADD-PATH feature 134 is complex and requires more state in the network in general.

Figure 2:
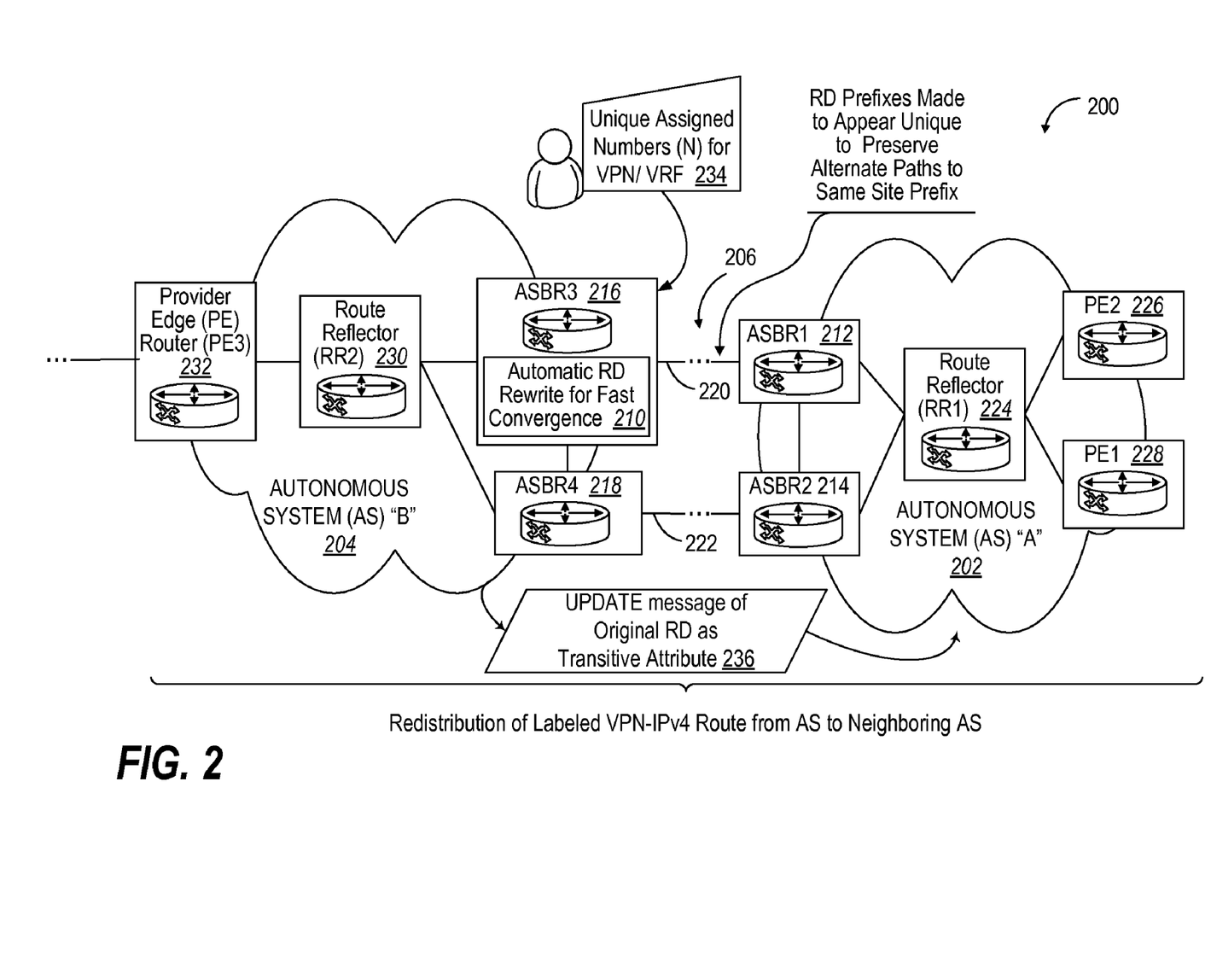
FIG. 2 illustrates a block diagram of a VPN connecting two ASes with automatic route distinguisher rewrite for fast convergence.

In FIG. 2, in an illustrative aspect, a virtual private network (VPN) 200 of a plurality of autonomous systems (ASes), depicted as AS "A" 202 and AS "B" 204, has an inter-AS backbone 206 formed in a fashion referred to as "Option B". In particular, each AS 202, 204 is interconnected by more than one autonomous system border router (ASBR) that performs external border gateway protocol (EBGP) with the other. Inclusion of an automatic RD rewrite component 210 at each autonomous system border router (ASBR) avoids having a route reflector (RR) only pass on the best BGP path, losing possible alternate BGP paths for fast convergence should part of inter-AS backbone 206 fail. For clarity, only two ASes 202, 204 are depicted, each having respectively a pair of ASBRs, specifically ASBR1 212 and ASBR2 214 of the AS "A" 202 and ASBR3 216 and ASBR4 218 of the AS "B" 204. Inter-AS path 220 connects ASBR1 212 and ASBR3 216 and inter-AS path 222 connects ASBR2 214 and ASBR4 218. AS "A" 202 has a route reflector (RR1) 224 connected between the ASBR1 212 and ASBR2 214, which are interconnected with each other as well, to Provider Edge router (PE1) 226 and PE2 router 228. AS "B" 204 has interconnected ASBR3 216 and ASBR4 218 each connected to a route reflector (RR2) 230, which in turn are connected to a provider edge (PE3) router 232.

In order to prevent only a best route from being transmitted, the origin ASBRs 216, 218 are provided unique prefixes for use in rewriting route distinguishers. Establishing these unique prefixes is assisted by establishing uniquely assigned numbers (N) for each VPN/VRF (VPN Virtual Routing and Forwarding), depicted at 234.

When the VPN NLRIs cross multiple ASs, if ASBRs at each AS boundary apply algorithm to rewrite RDs as described below, it leads to an exponential increase in the number of unique NLRIs created. In one aspect, the original RD can be carried as an attribute in the BGP UPDATE message the first time the RD is rewritten. This is a transitive attribute—so the intermediate ASBRs transparently pass the RD attribute. When an ASBR sees the original RD attribute with the NLRI, it applies the rewrite algorithm on this RD value instead of the RD extracted from the NLRI. This ensures that the number of unique NLRIs remains the same after they leave the origin AS, albeit there will be some redundant updates and withdraws for the NLRIs. Thus, the network 200 provides for advertisement of labeled virtual private network (VPN)-IPv4 route distinguishers (RD) from the origin AS "B" (AS) 204 to the neighboring AS "A" 202, communicating alternate paths for fast convergence upon loss of one BGP path 220, 222 between ASes 202, 204. The ingress PEs 226, 228 receive the original RD for determining the correct path via an UPDATE message 236 as a transitive attribute that passes unchanged through the RR1 224.

It should be appreciated that before two BGP routers can exchange routing updates, they must become established neighbors. After BGP routers establish a TCP connection, exchange information, and accept the information, they become established neighbors and start exchanging routing updates. If the neighbors do not reach an established state, they do not exchange BGP updates. The information exchanged before the neighbors are established includes the BGP version number, AS number, BGP router ID, and BGP capabilities.

BGP uses several attributes for the path-selection process. BGP uses path attributes to communicate routing policies. BGP path attributes include next hop, local preference, AS path, origin, multiexit discriminator (MED), atomic aggregate, and aggregator. BGP attributes can be categorized as well-known or optional. Well-known attributes are recognized by all BGP implementations. Optional attributes do not have to be supported by the BGP process; they are used on a test or experimental basis. Well-known attributes can be further subcategorized as mandatory or discretionary. Mandatory attributes are always included in BGP update messages. Discretionary attributes might or might not be included in the BGP update message. Optional attributes can be further subcategorized as transitive or nontransitive. Routers must advertise the route with transitive attributes to its peers even if it does not support the attribute locally. If the path attribute is nontransitive, the router does not have to advertise the route to its peers.

Figure 3:
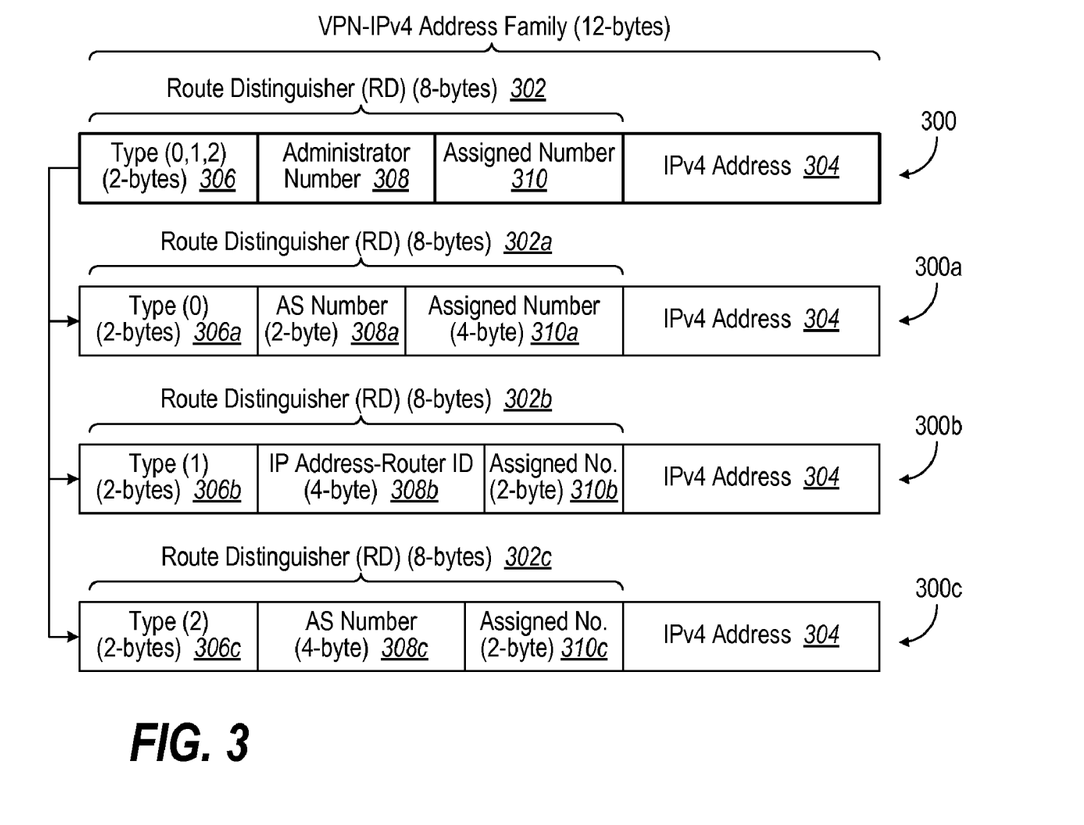
FIG. 3 illustrates a family of data structures for an VPN-IPv4 address each having an RD rewritten for fast convergence.

In FIG. 3, a data structure for a VPN IPv4 address family 300 for creating VPN Network Layer Reachability Information (NLRIs) includes an eight (8) byte route distinguisher (RD) 302 and a four (4) byte IPv4 address 304. The NLRI is exchanged between BGP routers using UPDATE messages. An NLRI is composed of a LENGTH and a PREFIX. The length is a network mask in Classless Inter-Domain Routing (CIDR) notation (eg. /25) specifying the number of network bits, and the prefix is the Network address for that subnet. The NLRI is unique to BGP version 4 and allows BGP to carry supernetting information, as well as perform aggregation. Examples of the NLRI are as follows:

/25, 204.149.16.128
/23, 206.134.32
/8, 10

Only one NLRI is included in an UPDATE Message, though there may be multiple AS-paths and AS-path attributes.

The RD 302 is constructed to include a two-bytes of RD type 306 (e.g., 0, 1, or 2), an administrator number 308 of either two or four bytes, and an assigned number 310 having a corresponding four or two bytes. The respective types (0), (1), and (2) 306a, 306b, 306c are depicted as part of VPN-IPv4 address 300a, 300b, and 300c, each with the same IPv4 address 304 but with a respective rewritten RD 302a, 302b, 302c. The RD 302a has a two-byte AS number 308a that serves as the administrator number and a four-byte assigned number 310a. The RD 302b has a four-byte IP Address-Router ID 308b and a two-byte assigned number 310b. The RD 302c has a four-byte AS Number 308c and a two-byte assigned number 310c.

Figure 4:
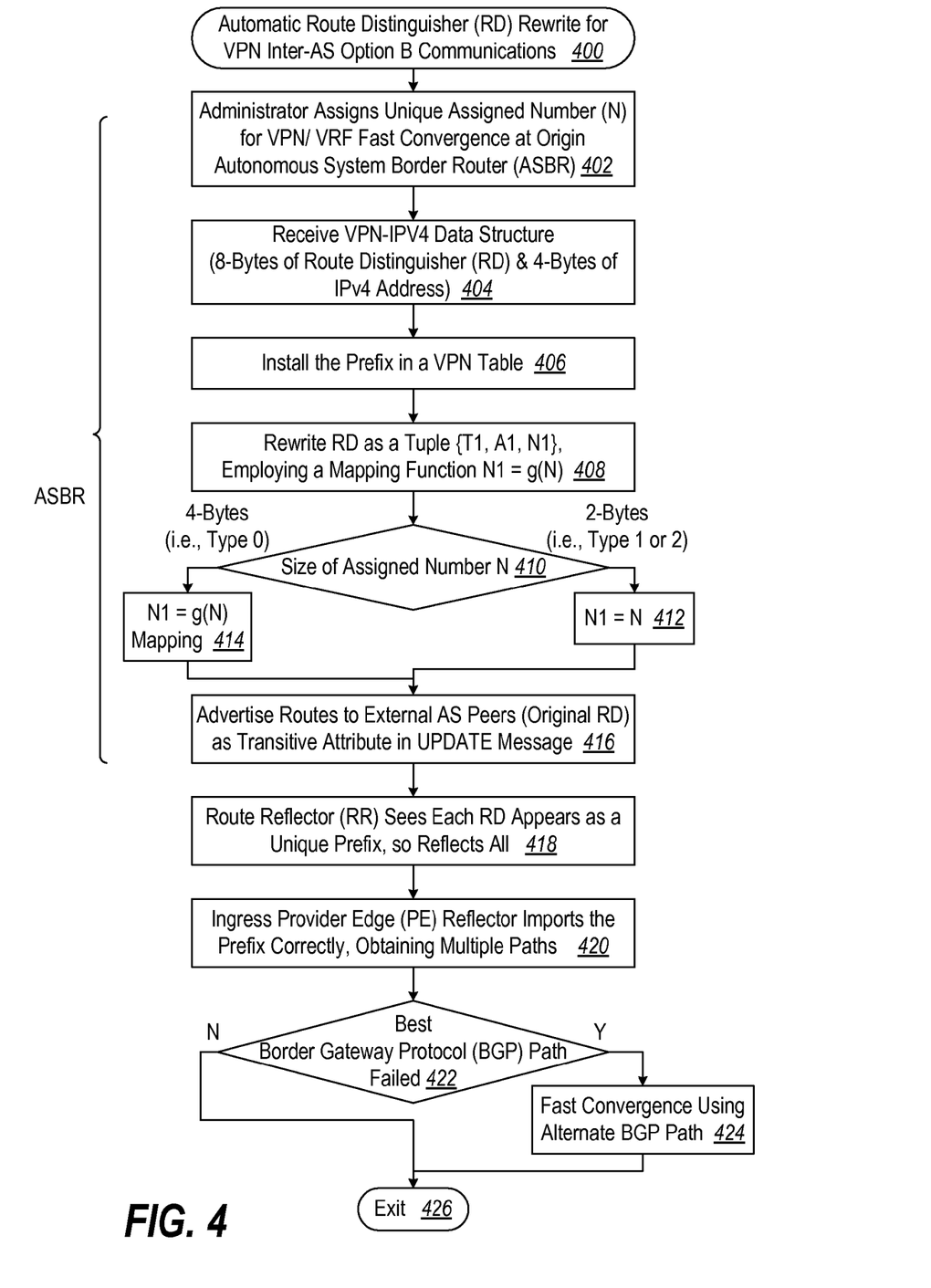
FIG. 4 illustrates a methodology for automatic route distinguisher (RD) rewrite for VPN Inter-AS Option B communications.

In FIG. 4, a methodology 400 automatically rewrites and utilizes the route distinguisher (RD) for fast convergence in a VPN Inter-AS Option B communications. In block 402, an administrator assigns unique assigned number (N) for VPN/VRF fast convergence at an origin ASBR. In block 404, the origin ASBR receives a VPN-IPv4 data structure. In block 406, the ASBR installs the prefix in a VPN table. In block 408, the origin ASBR rewrites the RD as a Tuple {T1, A1, N1}, employing a mapping function N1=g(N) that depends upon the size of the assigned number 310. In particular, a determination is made in block 410 as to whether the size of the Assigned Number is two bytes or four bytes. If two bytes (i.e., Type (1) or (2)), then in block 412 the mapping of N1 of the Tuple is set equal to the assigned number N. If four bytes (i.e., Type (0)), then in block 414 the unique mapping of each of those number to another two-byte number is performed, which can be a simple mapping to a new assigned number without necessarily performing an algorithmic computation. In block 416, the origin ASBR advertises the original RD to external AS peers as a transitive attribute of an UPDATE message. In block 418, with the benefit of the unique appearing prefix, the route reflectors of the external AS reflects all of the VPN-IPv4 addresses. In block 420, an ingress provider edge (PE) router imports the prefix correctly, obtaining multiple BGP paths and not just the best BGP path. In block 422, a determination is made by the PE router that the best BGP path has failed, and if so, fast convergence is achieved by using the alternate BGP path in block 424. Thereafter, the methodology 400 exits in block 426.

It should thus be appreciated with the benefit of the foregoing that ASBRs at each AS boundary rewrite RDs leading to an exponential increase in the number of unique NLRIs created. The original RD is carried as a transitive attribute in the BGP UPDATE message the first time that the RD is rewritten so that intermediate ASBRs transparently pass the RD attribute. When an ASBR sees the original RD attribute with the NLRI, the ASBR applies the above methodology 400 on this RD value instead of the RD extracted from the NLRI, ensuring that the number of unique NLRIs remains the same after leaving the origin AS, although a certain number of redundant updates and withdrawals for the NLRIs may occur.

Figure 5:
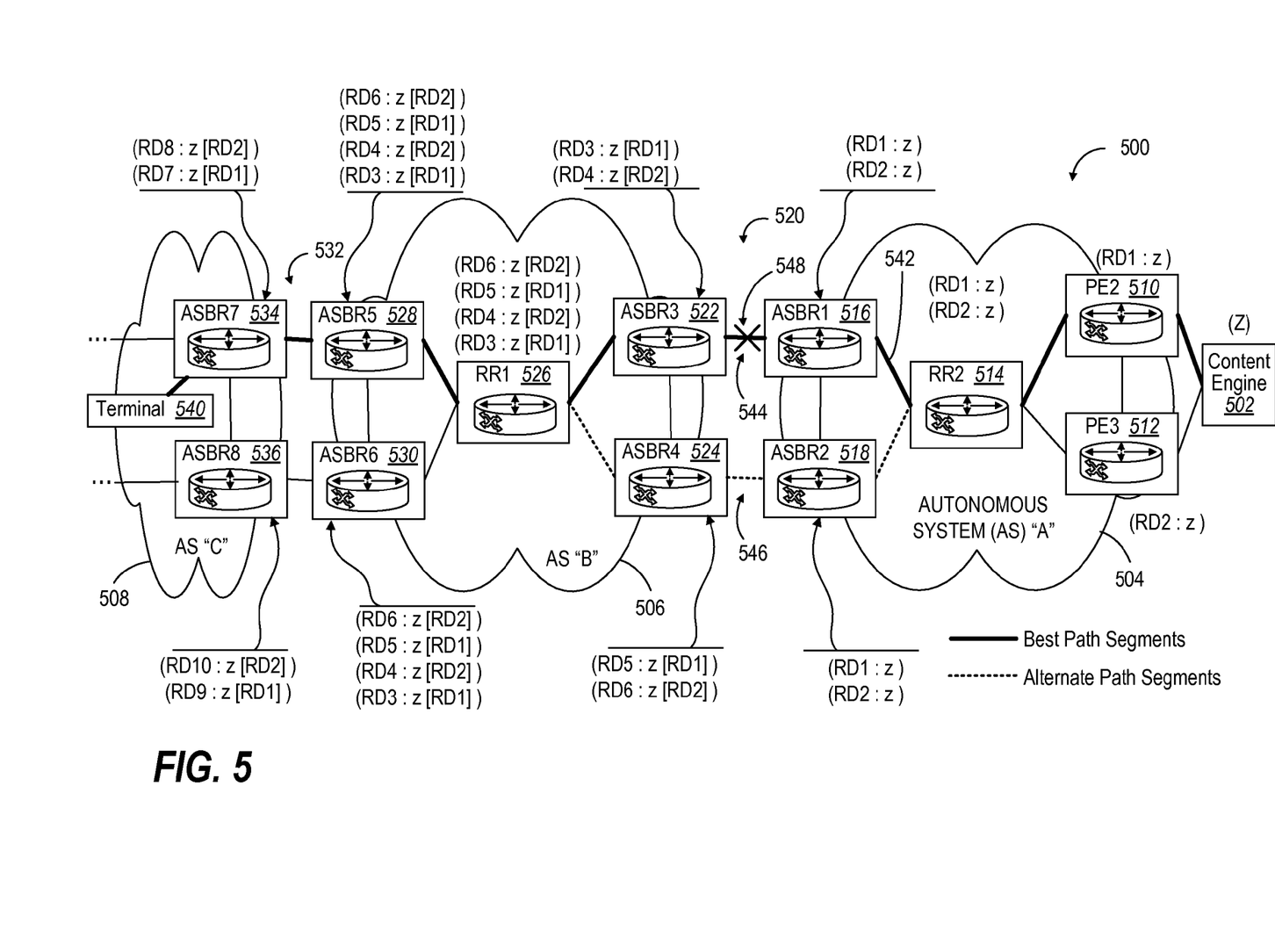
FIG. 5 illustrates a block diagram of a VPN serially connecting three ASes with the benefit of RD rewriting for fast convergence.

In FIG. 5, an illustrative implementation of the automatic RD rewrite is made for a multiple-AS Option B network 500 that illustrates VPN Network Layer Reachability Information (NLRI) crossing multiple ASes to address content (z) of a customer edge router (CE) 502. In order of serial proximity to the CE 502, the multiple ASes are depicted as AS "A" 504, AS "B" 506, and AS "C" 508.

The AS "A" 504 has PE2 510 that addresses the content (z) using (RD1:z) and has an interconnected PE3 512 that addresses using (RD2:z). Upstream, both PE2 510 and PE3 512 are connected to an RR2 514 that reflects these addresses (RD1:z) and (RD2:z). Connected to the RR2, interconnected ASBR1 516 and ASBR2 518 both have access to these two BGP paths (RD1:z) and (RD2:z).

The AS "B" 506 is connected via an inter-AS Option B backbone 520 to AS "A" 504 by including interconnected ASBR3 522 that communicates with ASBR1 516 and ASBR4 524 that communicates with ASBR2 518. The ASBR3 522 has unique EBGP paths (RD3:z[RD1]) and (RD4:z[RD2]) and the ASBR4 524 has unique EBGP paths (RD5:z[RD1]) and (RD6:z[RD2]) for reaching the content (z), thus able to use either path through the backbone 520 for fast convergence. An RR1 526 connected to both ASBR3 522 and ABR4 524 reflects all four unique EBGP paths (RD3:z[RD1]), (RD4:z[RD2]), (RD5:z[RD1]) and (RD6:z[RD2]) to interconnected ASBR5 528 and ASBR6 530.

The AS "C" 508 is connected via an inter-AS Option B backbone 532 to AS "B" 506 by including interconnected ASBR7 534 that communicates with ASBR5 528 and ASBR8 536 that communicates with ASBR6 530. ASBR7 534 has unique paths (RD7:z[RD1]) and (RD8:z[RD2]) and the ASBR8 536 has unique EBGP paths (RD9:z[RD1]) and (RD10:z[RD2]).

Consider that a terminal 540 resides an AS "C" 508 and is accessing content Z from content engine 502, which is initially via a best path 542 that include an EBGP communication path segment 544 between the ASBR3 522 and ASBR1 516. An alternate path segment 546 exists between ASBR4 524 and ASBR2 518 insofar as AS "A" 504 and AS "B" 506 are coupled by two pairs of ASBRs. If the route reflector 2 (RR2) 514 had received the Route Distinguishers (RD) for both paths segments 544, 546, the RR2 514 would have passed on only the best path segment 544 to provider edge routers (PE2, PE3) 510, 512. Thus, should the best path segment 544 fail as depicted at 548, then PE2 510 would not have an up-to-date route table that would include a viable path to AS "B" 506 until advertised, with a requisite delay during convergence. By contrast, with the advantageous use of a rewritten RD, the PE2 510 can already have the alternate path and make use of it when the best path segment 544 becomes unavailable, thus providing fast convergence.

Figure 6:
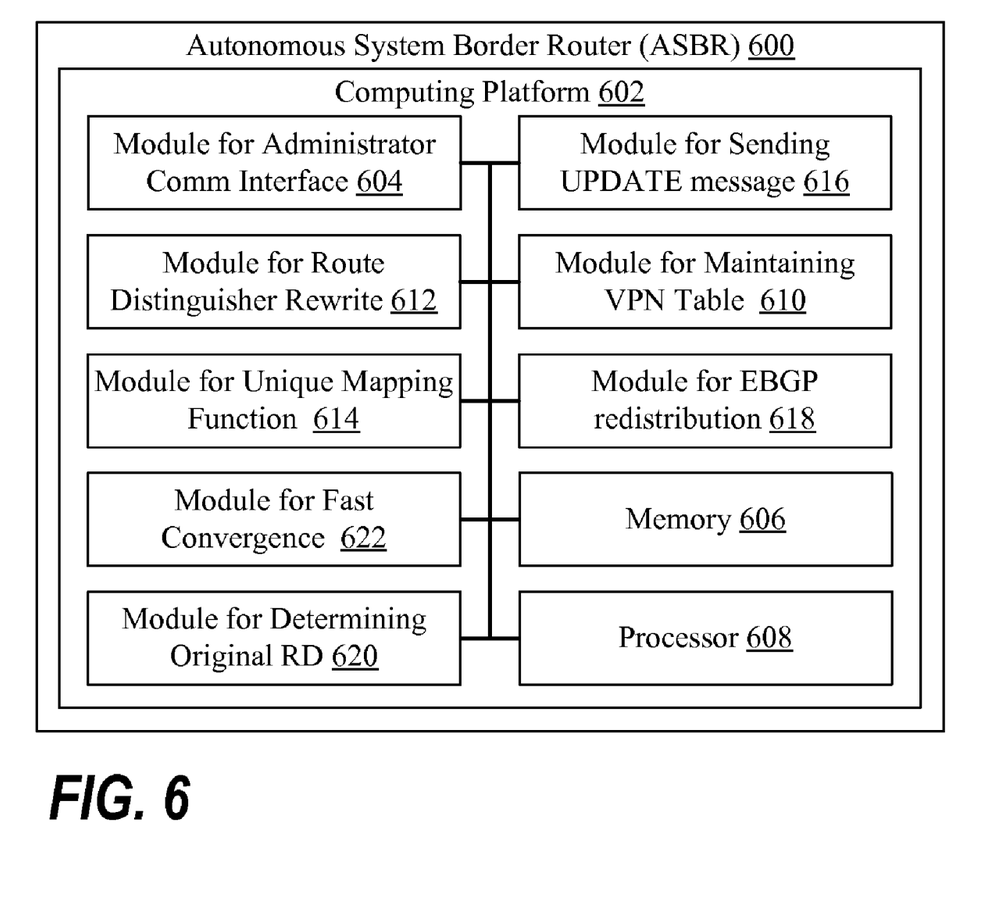
FIG. 6 illustrates a block diagram of computing platform of an autonomous system border reflector (ASBR) for performing automatic RD rewriting for fast convergence.

In FIG. 6, an ASBR 600 has a computing platform 602 for performing automatic RD rewrite. A means for receiving a set of unique numbers is depicted as a module 604 accessed in a memory 606 and executed by a processor 608. A module 610 for maintaining a VPN table stores the original RD in the memory 606. A module 612 for route distinguisher rewrite utilizes the set of unique numbers and the original RD from memory 606, taking advantage as necessary of a module 614 for unique mapping function. With the RD rewritten, the original RD is sent to external AS peers via a module 616 for sending UPDATE messages. Thereafter, communication using this rewritten RD occurs with use of a module 618 for external BGP redistribution of labels.

In the event that the ASBR 600 also serves in some instances as a provider edge (PE) reflector, a module 620 determines the original RD with reference to the VPN table that stored NLRI from the UPDATE message from another ASBR (not shown). Upon detection of loss of a best BGP path, a module 622 for fast convergence utilizes an alternate BGP path to quickly continue communications.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, in one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It should be appreciated that any patent, publication, or other disclosure material, in whole or in part, that is the to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is the to be incorporated by reference herein, but which conflicts with existing definitions, statements, or other disclosure material set forth herein, will only be incorporated to the extent that no conflict arises between that incorporated material and the existing disclosure material.

What is claimed is:

1. A method, comprising:
   assigning a set of unique numbers to each border router (ASBR) of an origin autonomous system (AS) having a plurality of ASBRs communicating to a plurality of ASBRs of a neighboring AS creating a plurality of paths between ASes in a virtual private network (VPN);
   rewriting an original route distinguisher (RD) such that a rewritten RD appears unique for each origin ASBR to preserve alternate Border Gateway Protocol (BGP) paths reflected by a route reflector in a neighboring AS; and
   sending the rewritten route distinguisher to a peer in the neighboring AS for correct importation of an alternate path for BGP fast convergence should a best path to the peer become unavailable.

2. The method of claim 1, further comprising rewriting the original route distinguisher (RD) such that the rewritten RD appears unique for each origin ASBR to preserve alternate Border Gateway Protocol (BGP) paths reflected by the route reflector in the neighboring AS that would otherwise hide all but a best route.

3. The method of claim 1, further comprising rewriting the original route distinguisher (RD) by using a selected one of the set of unique numbers assigned to the origin ASBR and a number mapping each RD to a unique number.

4. The method of claim 3, further comprising rewriting the original route distinguisher (RD) as an eight-byte entity composed of a type field, an administrator number, and an assigned number.

5. The method of claim 4, further comprising defining an assigned number value taken from the original RD in response to determining a two-byte assigned number and defining a unique mapping function for the assigned number value in response to determining a four-byte assigned number.

6. The method of claim 3, further comprising rewriting the original route distinguisher (RD) with a two-byte number for the origin AS.

7. The method of claim 6, further comprising rewriting the original RD with a two-byte type field and a four-byte unique assigned number.

8. The method of claim 3, further comprising rewriting the original route distinguisher (RD) with a four-byte number for an Internet Protocol (IP) address and router identifier.

9. The method of claim 8, further comprising rewriting the original RD with a two-byte type field and a two-byte unique assigned number.

10. The method of claim 3, further comprising rewriting the original route distinguisher (RD) with a four-byte number for the origin AS.

11. The method of claim 10, further comprising rewriting the original RD with a two-byte type field and a two-byte unique assigned number.

12. The method of claim 1, further comprising advertising the original RD in a BGP update message to peers in a neighboring AS when the original RD is rewritten for the first time to reduce growth in a number of rewritten RDs that has to be decoded.

13. The method of claim 12, further comprising advertising the original RD as a transitive attribute of the BGP update message so that the update message will be forwarded.

14. A method, comprising:
    receiving at an ingress provider edge (PE) router a rewritten route distinguisher (RD) from a peer that is one border router (ASBR) of an origin autonomous system (AS) having a plurality of ASBRs communicating to a plurality of ASBRs of a neighboring AS creating a plurality of paths between ASes, the peer being of the neighboring AS; and
    decoding an original route distinguisher (RD) from the rewritten RD that appears unique for each origin ASBR to preserve alternate Border Gateway Protocol (BGP) paths reflected by a route reflector in a neighboring AS.

15. The method of claim 14, further comprising decoding the original route distinguisher (RD) from the rewritten RD that appears unique for each origin ASBR to preserve alternate Border Gateway Protocol (BGP) paths reflected by the route reflector in the neighboring AS that would otherwise hide all but a best route.

16. The method of claim 14, further comprising:
    detecting a change or failure to a border router next hop; and converging to another border router based on local information maintained regarding an alternate path prior to BGP control plane convergence.

17. The method of claim 14, further comprising the automatic route distinguisher (RD) rewrite component for rewriting the original route distinguisher (RD) as a selected one of three formats:
(a) a first two-byte type number, a two-byte autonomous system (AS) number, and a four-byte uniquely mapped assigned number;
(b) a first two-byte type number, a four-byte Internet Protocol (IP) address router identifier, and a two-byte assigned number; and
(c) a first two-byte type number, a four-byte AS number, and a two-byte assigned number.

18. An apparatus, comprising:
an administrator communication interface to assign of a set of unique numbers to each border router (ASBR) of an origin autonomous system (AS) having a plurality of ASBRs communicating to a plurality of ASBRs of a neighboring AS creating a plurality of paths between ASes in a virtual private network (VPN);
an automatic route distinguisher (RD) component using one or more processors to rewrite an original route distinguisher (RD) such that a rewritten RD appears unique for each origin ASBR to preserve alternate Border Gateway Protocol (BGP) paths reflected by a route reflector in a neighboring AS; and
a communication module to send the rewritten route distinguisher to a peer in the neighboring AS for correct importation of an alternate path for BGP fast convergence should a best path to the peer become unavailable.

19. The apparatus of claim 18, further comprising the automatic route distinguisher (RD) component to rewrite the original route distinguisher (RD) such that the rewritten RD appears unique for each origin ASBR to preserve alternate Border Gateway Protocol (BGP) paths reflected by the route reflector in the neighboring AS that would otherwise hide all but a best route.

20. The apparatus of claim 18, further comprising the automatic route distinguisher (RD) component to rewrite the original route distinguisher (RD) by using a selected one of the set of unique numbers assigned to the origin ASBR and a number mapping each RD to a unique number.

21. The apparatus of claim 20, further comprising the automatic route distinguisher (RD) component to rewrite the original route distinguisher (RD) as an eight-byte entity composed of a type field, an administrator number, and an assigned number.

22. The apparatus of claim 21, further comprising the automatic route distinguisher (RD) component to define an assigned number value taken from the original RD in response to determining a two-byte assigned number and defining a unique mapping function for the assigned number value in response to determining a four-byte assigned number.

23. The apparatus of claim 20, further comprising the automatic route distinguisher (RD) component to rewrite the original route distinguisher (RD) with a two-byte number for the origin AS.

24. The apparatus of claim 23, further comprising the automatic route distinguisher (RD) component to rewrite the original RD with a two-byte type field and a four-byte unique assigned number.

25. The apparatus of claim 20, further comprising the automatic route distinguisher (RD) component to rewrite the original route distinguisher (RD) with a four-byte number for an Internet Protocol (IP) address and router identifier.

26. The apparatus of claim 25, further comprising the automatic route distinguisher (RD) component to rewrite the original RD with a two-byte type field and a two-byte unique assigned number.

27. The apparatus of claim 20, further comprising the automatic route distinguisher (RD) component to rewrite the original route distinguisher (RD) with a four-byte number for the origin AS.

28. The apparatus of claim 27, further comprising the automatic route distinguisher (RD) component to rewrite the original RD with a two-byte type field and a two-byte unique assigned number.

29. The apparatus of claim 18, further comprising the communication module to advertise the original RD in a BGP update message to peers in a neighboring AS when the original RD is rewritten for the first time to reduce growth in a number of rewritten RDs that has to be decoded.

30. The apparatus of claim 29, further comprising the communication module to advertise the original RD as a transitive attribute of the BGP update message so that the update message will be forwarded.

31. An apparatus, comprising:
a communication module to receive at an ingress provider edge (PE) router a rewritten route distinguisher (RD) from a peer that is one border router (ASBR) of an origin autonomous system (AS) having a plurality of ASBRs communicating to a plurality of ASBRs of a neighboring AS creating a plurality of paths between ASes, the peer being of the neighboring AS; and
an automatic route distinguisher (RD) component using at least one processor to decode an original route distinguisher (RD) from the rewritten RD that appears unique for each origin ASBR to preserve alternate Border Gateway Protocol (BGP) paths reflected by a route reflector in a neighboring AS that would otherwise hide all but a best route should the best route to the peer become unavailable.

32. The apparatus of claim 31, further comprising the automatic route distinguisher (RD) component to decode the original route distinguisher (RD) from the rewritten RD that appears unique for each origin ASBR to preserve alternate Border Gateway Protocol (BGP) paths reflected by the route reflector in the neighboring AS that would otherwise hide all but a best route.

33. The apparatus of claim 31, further comprising the communication module to detect a change or failure to a border router next hop, and for converging to another border router based on local information maintained regarding an alternate path prior to BGP control plane convergence.

34. The apparatus of claim 31, further comprising the automatic route distinguisher (RD) rewrite component to rewrite the original route distinguisher (RD) as a selected one of three formats:
(a) a first two-byte type number, a two-byte autonomous system (AS) number, and a four-byte uniquely mapped assigned number;
(b) a first two-byte type number, a four-byte Internet Protocol (IP) address router identifier, and a two-byte assigned number; and
(c) a first two-byte type number, a four-byte AS number, and a two-byte assigned number.

* * * * *